May 10, 1949.　　　　A. J. GALKO　　　　2,469,381
HANDWHEEL LOAD MEASURING DEVICE
Filed Aug. 2, 1945
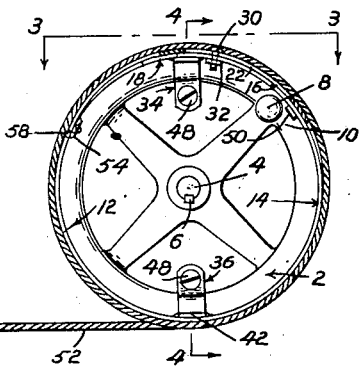
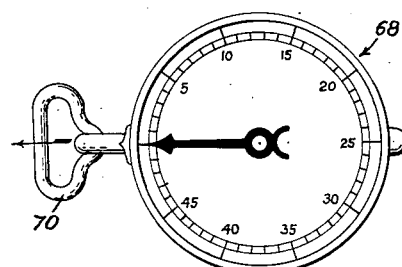
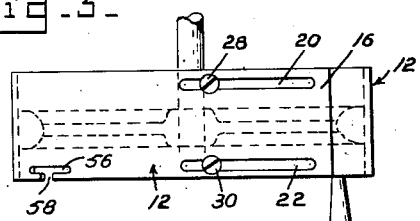
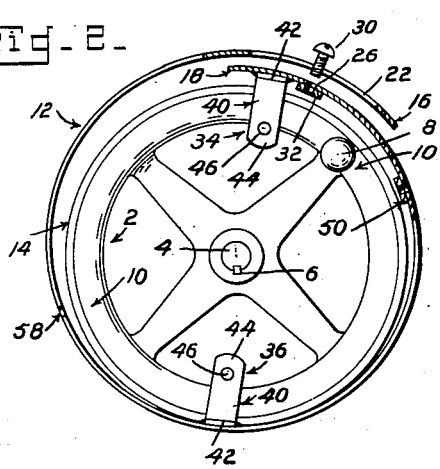
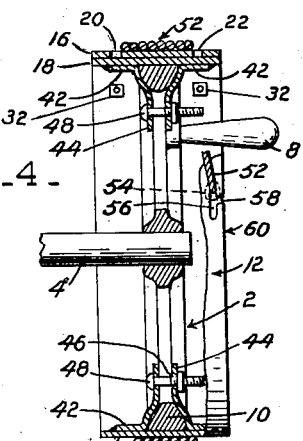
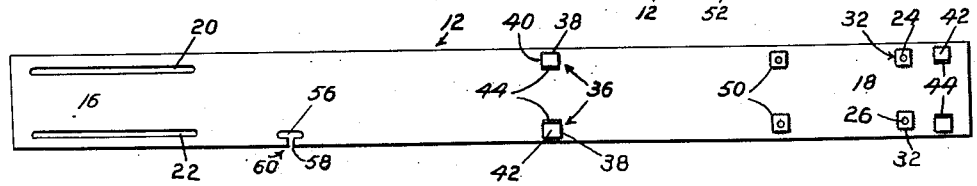
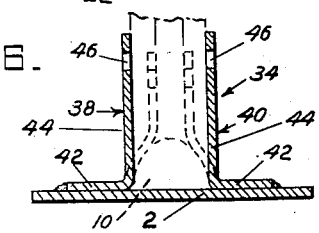
Inventor
Andrew J. Galko
By J. H. Church & H. E. Thibodeau
Attorneys Patented May 10, 1949

2,469,381

UNITED STATES PATENT OFFICE 2,469,381

HANDWHEEL LOAD MEASURING DEVICE

Andrew J. Galko, Aberdeen, Md.

Application August 2, 1945, Serial No. 608,561

3 Claims. (Cl. 73—133)

(Granted under the act of March 3, 1883, as amended April 30, 1928; 370 O. G. 757)

The invention described herein may be manufactured and used by or for the Government for governmental purposes without the payment to me of any royalty thereon.

This invention relates to the measurement of handwheel loads.

A purpose of the invention is to provide an improved, simple, convenient, relatively inexpensive and rapid means for measuring the force necessary to be applied to handwheels secured to shafts in order to rotate the shafts.

A further purpose of the invention is to provide a handwheel load measuring device which is adjustable to fit handwheels having differing diameters.

Another purpose of the invention is to provide a handwheel load measuring device so constructed as to adequately support the pull rope against slipping off the device.

A further purpose of the invention is to permit the use of a pull rope for measuring the force required to rotate handwheels regardless of the thickness of the handwheel periphery measured parallel to the axis of the handwheel.

Other purposes and advantages of the invention will be apparent from the following description as illustrated in the accompanying drawings, in which, Figure 1 is an elevational view of the improved measuring device, Figure 2 is an elevational partly broken out view of the drum of the device partly disassembled from the handwheel, Figure 3 is a plan view taken along line 3—3 of Figure 1, but not showing the pull rope, Figure 4 is a sectional view taken along line 4—4 of Figure 1, Figure 5 is a developed view of the drum of the measuring device, and Figure 6 is a fragmentary detail view showing how the clamps are deformable to embrace the handwheel rim.

It has long been the practice to take measurements of the load existing on elevating and traversing handwheels of artillery carriages by means of a spring scale attached to one end of a cloth tape, usually approximately two inches wide and six feet long, wound on the handwheel periphery. The other end of the tape was usually tied to a handwheel spoke to secure it to the wheel. Unwinding the tape by pulling the scale gave a reading of the handwheel load at the periphery in pounds. However, this method presented difficulties due mainly to the fact that most handwheels were quite thin at the periphery and considerable dexterity was required to keep the cloth tape on the periphery of the handwheel during winding and unwinding. Only personnel having sufficient experience were able to obtain valid and acceptable load measurements by this method.

The present invention overcomes this difficulty and permits acceptable load measurements to be obtained quickly and easily by relatively inexperienced personnel regardless of the thickness of the handwheel at its periphery.

Thus, as best illustrated in Figure 1, a handwheel 2 is mounted on a shaft 4 and secured thereto by any suitable means such as a key 6. A handle 8 secured to the handwheel at its rim 10 and extending from the side of said rim in a direction parallel to the shaft 4, allows the handwheel to be rotatably moved by hand as desired in either a clockwise or counterclockwise direction about the axis of the shaft 4.

According to the present invention, a drum 12 made of any suitable sheet material such as sheet metal or plastic, is wrapped around the outer peripheral surface 14 of the handwheel 2 as shown, the length of the drum 12 being substantially greater than the circumference of the handwheel to permit the end 16 of the drum 12 to overlie the other end 18 of the drum, as best seen from Figure 2. The end portion 16 of the drum is provided with two parallel cut-out slots 20 and 22, and the end portion 18 of the drum is provided with two threaded holes 24 and 26 each hole being so located as to underlie one of the slots 20 or 22 when the end portion 16 overlies the end portion 18. Screws 28 and 30 extend through slots 20 and 22 respectively, being threadably received in holes 24 and 26 respectively. Bosses 32 are welded to the relatively thin sheet metal of the drum under each hole 24 and 26 to provide sufficient thickness of metal for supporting the threaded screws 28 and 30 in the holes which are thus formed through the boss and the thickness of the drum. The bosses 32 may, if desired, be conveniently obtained by merely taking iron bolt nuts threaded to fit the screws 28 and 30, and welding them in place beneath each hole 24 and 26 as indicated.

Clamps 34 and 36 serve to fasten the drum securely to the rim of the handwheel as indicated in the drawings. As shown, each clamp 34 and 36 is formed of two substantially L-shaped angle pieces 38 and 40. All the angle pieces on a drum are identical in dimensions. The shorter leg or base 42 of each angle is firmly welded or riveted to the inner surface of the drum 12 at the approximate locations shown, the angles being located in pairs with their projecting legs 44 parallel to and facing each other and their other legs 42 extending in opposite directions from each other as shown. The distance between the two angle pieces of each clamp is great enough to receive between the angles the thickest handwheel expected to be tested.

Each projecting leg 44 has a hole 46 near its outer end, and a bolt 48 extending through the aligned holes 46 is provided for each clamp 34 and 36, whereby the projecting legs 44 of each clamp may be drawn tightly toward each other thereby firmly embracing the rim 10 of the wheel and thus securely holding the drum on the wheel as shown. The angle pieces are made of sheet metal sufficiently flexible to allow the legs 44 to embrace the rim 10 as the bolts 48 are tightened.

To place the drum on the handwheel, the bolts 48 are first removed. Then, as indicated in Figure 2, the drum is opened out to a sufficiently large diameter to allow it to be placed around the rim of the handwheel with the brackets 34 and 36 straddling the rim, and the diameter of the drum is then reduced by drawing the end portion 16 of the drum over end portion 18 as shown, so that the rim surface of the wheel is everywhere in contact with the drum and the brackets or clamps 34 and 36 embrace the rim of the handwheel. Then the screws 28 and 30 are inserted through their respective slots 20 and 22 and threaded into bosses 32 in end portion 18 of the drum. Tightening the screws 28 and 30 causes the end portions 16 and 18 to be tightly drawn together. At the same time, the bolts 48 are inserted through the aligned holes 46 in each clamp 34 and 36 and tightened, drawing the legs 44 of each clamp toward each other, thereby tightly embracing the rim of the handwheel as best seen in Figure 4. Thus the drum is securely fastened to the rim of the handwheel, the clamps 34 and 36 serving particularly to keep the drum in place. For larger handwheels additional clamps may be employed besides those designated 34 and 36, for example, one clamp every 90 degrees instead of every 180 degrees as illustrated, but this will not usually be necessary.

The slots 20 and 22 are made long enough to allow the drum to be adjusted to fit a number of handwheel diameters, and in addition, smaller handwheels can be accommodated by use of additional bosses with threaded holes, such as those located at 50 in Figures 2 and 5. When these are used, the slots 20 and 22 will overlie the bosses located at 50, and the screws 28 and 30 are threaded into the holes in bosses 50 instead of those at 32.

With the drum firmly in place, there is thus provided a broad cylindrical surface around which a rope 52 may be wound in side-by-side turns as best seen in Figure 4. One end of the pull rope 52 is knotted as at 54 in Figures 1 and 4, and the knot 54 inserted through and held in place in a short slot 56 formed in the drum, parallel to the long slots 20 and 22, but near one edge of the drum and having a cut out portion 58 of the drum connecting the slot 56 with the edge 60 of the drum. The other end 62 of the pull rope 52 has a loop formed in it at 64 through which is removably inserted a pull hook 66 which is attached to a tension scale 68. Pulling by hand on the scale handle 70 will allow a reading of the pull load in pounds to be obtained by inspection of the scale face.

A sufficient length of rope 52 is coiled on the drum to permit readings to be taken throughout several complete turns of the handwheel.

Although a preferred embodiment of the invention has been described in specific terms it is to be understood that numerous changes may be made in the size, shape, materials and arrangement without departing from the spirit of the invention and its scope as claimed herein.

I claim:

1. In a device for measuring the tangential force necessary to rotate a handwheel, an elongated strip having a width greater than the maximum axial dimension of the rim of said handwheel and a length sufficient to provide overlapping ends when positioned about the periphery of said handwheel to form a drum, means to secure said ends together, means to secure said strip to said handwheel, a pull rope wound about said drum and having one end secured thereto, the other end of said rope being adapted for attachment to the tension responsive element of a scale, the frame of said scale having means for applying tension to said rope to thereby unwind the same and cause said scale to indicate the tension in said rope.

2. A device for measuring the tangential force necessary to rotate a handwheel, comprising a flat elongated strip wider than the maximum axial dimension of the rim of said handwheel and having a length sufficient to provide overlapping ends when said strip is wound about the periphery of said rim there being a longitudinal slot in one said overlapping end adapted to register with a hole in the other end, whereby said strip may be fitted to handwheels of different diameters, by a bolt passing through said slot and hole, a rope wound about said strip and having one end secured thereto and having its other end connected to the actuating element of a tension scale, whereby a pull applied to said scale is transmitted to said handwheel and measured on said scale.

3. An adjustable drum for a handwheel load measuring device, comprising a flexible drum body portion constructed and arranged for being secured to the rim of a handwheel in encircling relation thereto, clamps carried on said body portion for tightly embracing said rim, and means on said body portion constructed and arranged for securing one end of a pull rope to said body portion, said body portion being formed of a piece of sheet material having a length substantially greater than the circumference of the handwheel to be tested and substantially wider than the rim of said body portion, whereby, as said body portion is wrapped around said rim one of the ends of said body portion overlies the other end, the latter end portion having at least one threaded hole therethrough and the overlying end portion having at least one elongated slotted opening therethrough in substantial registering alignment with said hole, and screw means extending through said slot and threaded into said hole for drawing said two end portions tightly into contact.

ANDREW J. GALKO.

REFERENCES CITED

The following references are of record in the file of this patent:

UNITED STATES PATENTS

| Number | Name | Date |
| --- | --- | --- |
| 271,998 | Trowbridge | Feb. 6, 1883 |
| 1,068,537 | Smith | July 29, 1913 |
| 1,252,847 | Roberts | Jan. 8, 1918 |
| 1,267,376 | Chilson | May 28, 1918 |
| 1,944,344 | Holmes | Jan. 23, 1934 |

FOREIGN PATENTS

| Number | Country | Date |
| --- | --- | --- |
| 24,399 | Norway | Mar. 23, 1914 |
| 146,217 | Great Britain | June 26, 1920 |